United States Patent [19]

Jansing et al.

[11] 3,717,352

[45] Feb. 20, 1973

[54] SEAL FOR ROTATABLE COVERS OF NUCLEAR REACTORS

[75] Inventors: Walter Jansing, Bensberg-Frankenforst; Hartwig Rohrs, Bensberg-Untereschbach; Helmut Rothfuss, Bensberg, all of Germany

[73] Assignee: Interatom Internationale Atomreaktorbau GmbH, Bensberg/Cologne, Germany

[22] Filed: April 21, 1970

[21] Appl. No.: 30,513

[30] Foreign Application Priority Data

April 26, 1969 Germany..................P 19 21 377.5

[52] U.S. Cl....................................277/34.3, 277/59
[51] Int. Cl. ..............................................F16j 15/46
[58] Field of Search..............277/59, 34.3; 220/46 P

[56] References Cited

UNITED STATES PATENTS 3,261,611   7/1966   Maidment..........................277/59 X
3,514,115   5/1970   Gallo..................................277/34.3

Primary Examiner—Samuel B. Rothberg
Attorney—Curt M. Avery, Arthur E. Wilfond, Herbert L. Lerner and Daniel J. Tick

[57] ABSTRACT

Seal for a large rotatable cover of a nuclear reactor containing protective gas and cooled with sodium wherein the cover is formed of a radially outer rotatable cover portion and a radially inner cover portion mutually connected by a plurality of peripherally distributed screws and the reactor has a flanged opening closable by the cover, comprising a removable outer ring surrounding the outer rotatable cover portion and threadedly secured to the flange of the reactor, a pair of spaced-apart inflatable hollow sealing rings surrounding the outer cover portion and received in the outer ring, a blocking gas connection located in the space between the sealing rings for supplying blocking gas to the space, a layer of tetrafluorethylene coated on the hollow sealing rings in situ in the outer ring, and an additional sealing member located below the inner cover portion, the screws connecting the inner and outer cover portions being adjustable for lowering the inner cover portion into sealing engagement with additional sealing member.

5 Claims, 1 Drawing Figure

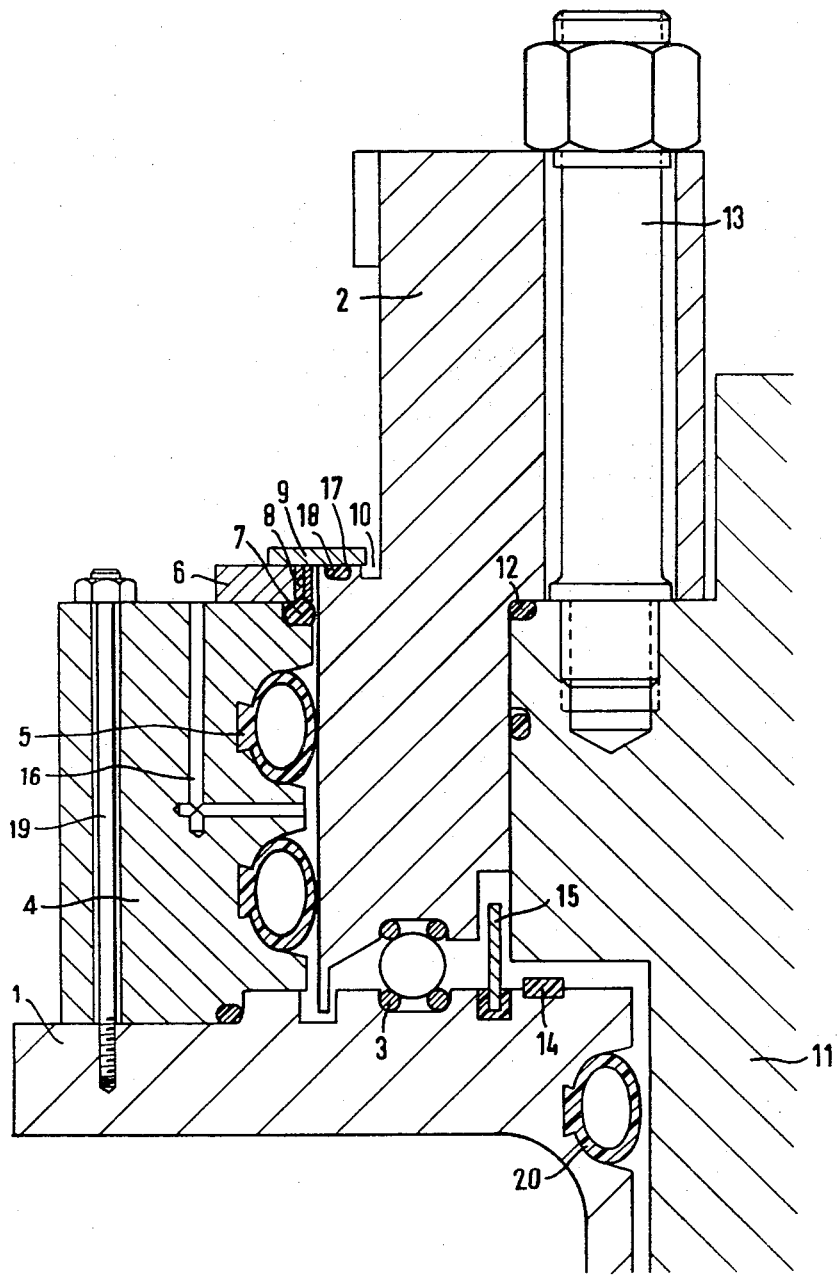

SEAL FOR ROTATABLE COVERS OF NUCLEAR REACTORS

Our invention relates to seal for large rotatable covers of nuclear reactors containing protective gas and cooled with sodium which meets extreme requirements of tightness and sealing against leakage.

Nuclear reactors have been proposed heretofore with one or more rotatable, eccentrically mounted covers by means of which each fuel element can be exchanged or transferred to a different location in the reactor.

It has also been known heretofore to employ inflatable hollow sealing members which are subjected to pressure in order to provide the sealing effect and are either depressurized or in fact subjected to vacuum in order to reduce the cross section thereof so as to permit passage through the space previously sealed thereby when they are in inflated condition.

In the invention of the instant application however it is not intended that a relatively large cross section is to be opened or closed by means of a seal but rather that a narrow gap is to be sealed both when the members defining the narrow gap are relatively rotatable and are stationary. Materials employed for producing inflatable hollow sealing members such as rubber or plastic material, for example, in the dry state thereof, have a very high coefficient of friction as compared to that of steel or other metals. When the materials employed for producing the hollow sealing members are smeared with liquid media, this coefficient of friction is markedly reduced but, however, this has a disadvantage in that the liquid media flow downwardly in the direction of gravity and penetrate in a most undesired manner into the interior of the reactor. If dry lubricant media, which have a flaky granular appearance when examined under a microscope, are employed, the coefficient of friction is reduced somewhat but nevertheless not enough to meet the extreme requirements as to tightness and imperviousness in the instant case for nuclear reactors, for example, because small interstices remain open between the individual scales of the granular dry lubricant.

It is furthermore known that tetrafluorethylene has very low coefficients of static and sliding friction.

It is accordingly an object of our invention to provide seal for large rotatable covers of a nuclear reactor containing protective gas and cooled with sodium which meets extreme requirements as to sealability and longevity and durability.

With the foregoing and other objects in view, we provide, in accordance with our invention, seal for a large rotatable cover of a nuclear reactor containing protective gas and cooled with sodium, wherein the cover is formed of a radially outer rotatable cover portion and a radially inner cover portion mutually connected by a plurality of peripherally distributed screws and the reactor has a flanged opening closable by the cover, comprising a removable outer ring surrounding the outer rotatable cover portion and threadedly secured to the flange of the reactor, a pair of spaced-apart inflatable hollow sealing rings surrounding the outer cover portion and received in the outer ring, a blocking gas connection located in the space between the sealing rings for supplying blocking gas to the space, a layer of tetrafluorethylene coated on the hollow sealing rings in situ in the outer ring, and an additional sealing member located below the inner cover portion, the screws connecting the inner and outer cover portions being adjustable for lowering the inner cover portion into sealing engagement with the additional sealing member.

The hollow sealing rings are received with their reinforced outer sides in suitably shaped grooves formed at the inside of the removable outer ring and are coated with the tetrafluorethylene after they have been inserted in the outer ring. If the hollow sealing rings were coated with the tetrafluorethylene before they were inserted in the outer ring, the relative coefficient of friction of the outer ring and the hollow sealing rings would be reduced in a most undesirable manner. The hollow sealing rings could then be twisted with respect to the outer ring and the pressure lines connected thereto for inflating the same could then be torn off.

The outer cover portion is mounted on a wire ball bearing and is provided at the largest diameter portion thereof with a very well machined cylindrical bearing surface which is coated with tetrafluorethylene and is sealed by the inflatable hollow sealing rings. The inner cover portion is sealed with respect to the outer cover portion by two O-rings. The additional sealing member onto which the inner cover portion is lowerable by adjustment of the peripherally distributed screws is preferably a soft iron sealing member having a comb or cam profile. Due to this construction, the lowerable inner cover portion can be rapidly sealed with respect to the casing of the nuclear reactor at a time of need, and the outer ring can be removed with the hollow sealing members for the purpose of inspection or exchange of the hollow sealing members. When the outer ring is being installed or removed with the hollow sealing members contained therein, the latter are expediently evacuated so that they can be raised from the sealing surfaces and not damaged.

In accordance with a further feature of our invention, a further sealing member is located below the wire ball bearing which is inflated during operation of the reactor and is evacuated when the reactor cover is rotated. This last mentioned hollow sealing member serves to protect the support bearing, namely the wire ball bearing, against sodium vapors. Since this last mentioned hollow sealing member cannot be exchanged during operation of the reactor, it is advisable to evacuate it during rotation of the reactor cover in order to protect it from wear.

In accordance with yet another feature of our invention, we cover the gap to be sealed between the outer ring and the rotatable reactor cover with an additional ring so that no dirt particles can fall directly into the gap that is to be sealed. This covering is secured either to the outer ring or to the rotatable cover, and one or more grooves are formed either in the rotatable cover or in the outer ring below the overlapping edge of this cover ring so as to receive therein any particles of dirt that might fall over the edge of the cover ring. One or more of these grooves are provided in accordance with our invention with an O-ring to effect a sealing function when the rotatable reactor cover is stationary.

The seal of our invention, when sealing rotatable covers for sodium-cooled nuclear reactors that contain protective gas, results in a very low rate of leakage. Without the seal of our invention, the rotatable reactor cover has to be threadedly secured with the other cover or with the reactor casing during operation of the reactor and must also be sealed thereto, and during the very short time, as compared to the total operating time, in which the cover is supposed to be rotated, the pressure in the reactor must be reduced and sealing by liquid metal, which is often unserviceable due to oxide deposition, must be provided. During the inspection of the hollow sealing members without the additional sealing of the inner cover portion, the sodium would have to be solidified by suitable cooling devices thereby to provide a seal between the reactor casing and the rotatable cover. Since relatively large volumes must be cooled in such a case, a very expensive cooling device or a very long period of time for cooling would then be required.

Other features which are considered as characteristic for the invention are set forth in the appended claims.

Although the invention is illustrated and described herein as embodied in seal for rotatable covers of nuclear reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying single FIGURE of the drawing in which there is shown diagrammatically and in cross section the seal of our invention as assembled on the cover of a nuclear reactor.

Referring now to the drawing, there is shown an upper flange 1 surrounding an opening in a casing of a nuclear reactor. A radially outer cover portion 2 is rotatably mounted on a wire ball bearing 3 which bears on the reactor casing flange 1. A removable outer ring 4 is threadedly secured to the flange 1 of the reactor casing and contains two hollow sealing rings 5 received in suitable recesses formed on the inner periphery thereto. Between the hollow sealing members 5, there is provided in the outer ring 4 a duct 16 for supplying a blocking gas to the gap space between the hollow seals 5. A suitable blocking gas is a protective gas such as argon. The hollow interior of the sealing members 5 are connected by non-illustrated conventional tubes to a suitable pumping device, for example, for alternately inflating and evacuating the same. A third hollow sealing ring 20 is located below the support bearing 3 and is inflatable during operation of the reactor and is evacuated when rotating the cover 2. Above the outer ring 4, an additional ring 6 is provided which presses a O-ring seal 7 into the gap that is to be sealed between the stationary outer ring 4 and the rotatable cover portion 2. The O-ring 7 is fastened by a strip 8 vulcanized thereto to the ring 6 and is therefore depressurized by loosening the ring 6 or is removed entirely when the reactor cover is rotated. A cover ring 9 is mounted above the gap that is being sealed and is located between the outer ring 4 and the rotary outer cover portion 2. The inner edge of the cover ring 9 terminates above a groove 10 formed in the rotatable cover portion 2. In a further groove 17 formed in the rotatable cover portion 2 and located directly below the cover ring 9 there is received an O-ring 18. The cover ring 9 is threadedly secured to the ring 6 by screws 19, for example, only one of is being seen in the FIGURE, and can be raised together with the ring 6 upon rotation of the reactor cover. At the radially inner side of the outer cover portion 2 there is provided an inner cover portion 11 which, under normal conditions is threadedly secured to the outer cover portion by a plurality of screws 13 disposed about the periphery thereof and is sealed with respect to the outer cover portion 2 by a pair of O-rings 12. If the inflatable hollow seals 5 are to be raised together with the outer ring 4 for inspection or exchange of the seals 5, the inner cover portion 11 is lowered by suitably adjustably turning the screws 13 so that the inner cover portion 11 abuts a soft iron seal 14 having a comb or cam profile and is thereby temporarily sealed in a makeshift manner. Between the soft iron seal 14 and the wire ball bearing 3 there is provided a vertically extending flat steel ring 15 which prevents further travel of any solid particles within the gap located between the reactor cover and the flange 1 of the reactor casing.

We claim:

1. Seal for a large rotatable cover of a nuclear reactor containing protective gas and cooled with sodium wherein the cover is formed of a radially outer rotatable cover portion and a radially inner cover portion mutually connected by a plurality of peripherally distributed screws and the reactor has a flanged opening closable by the cover, comprising a removable outer ring surrounding the outer rotatable cover portion and threadedly secured to the flange of the reactor, a pair of spaced-apart inflatable hollow sealing rings surrounding the outer cover portion and received in said outer ring, a blocking gas connection located in the space between said sealing rings for supplying blocking gas to said space, a layer of tetrafluorethylene coated on said hollow sealing rings in situ in said other outer ring, and an additional sealing member located below said inner cover portion, the screws connecting the inner and outer cover portions being adjustable for lowering the inner cover portion into sealing engagement with said additional sealing member.

2. Seal according to claim 1, wherein support bearing means are mounted on the reactor flange and rotatably support said rotary outer cover portion, and including a third hollow sealing ring located below said support bearing means, said third hollow sealing ring being inflatable during operation of the reactor and being evacuated when rotating the cover.

3. Seal according to claim 1, wherein said hollow sealing rings, in inflated condition thereof, seal a gap formed between said outer ring and said outer cover portion, and including a flat ring mounted partly on said outer ring and said outer cover portion for covering said gap.

4. Seal according to claim 3, wherein said outer ring and said outer cover portion are formed with at least one annular groove, respectively, located below said flat ring.

5. Seal according to claim 3, including at least one O-ring received in said annular grooves.

* * * * *